United States Patent [19]

Roden

[11] Patent Number: 6,074,685
[45] Date of Patent: Jun. 13, 2000

[54] CATTLE FEED

[76] Inventor: Wilbur Ray Roden, P.O. Box 4123, Victoria, Tex. 77903

[21] Appl. No.: 09/414,802

[22] Filed: Oct. 8, 1999

[51] Int. Cl.[7] .................. A23K 1/02; A23K 1/14
[52] U.S. Cl. ................. 426/630; 635/650; 635/807
[58] Field of Search .................... 426/635, 650, 426/630, 807

[56] References Cited

FOREIGN PATENT DOCUMENTS

| | | |
|---|---|---|
| 55-064766 | 5/1980 | Japan . |
| 56-008651 | 1/1981 | Japan . |
| 58-129937 | 8/1982 | Japan . |

OTHER PUBLICATIONS

Baertsche et al., J. Animal Sci., vol. 63, p. 2028 to 2043, 1986.

*Primary Examiner*—Chhaya D. Sayala

[57] ABSTRACT

A dry cattle feed comprised of 80% to 87% hardwood meal naturally containing phosphorous, potassium, calcium, magnesium, sodium, zinc, iron, copper, and manganese harvested from all varieties of oak, pecan, and mesquite trees.

2 Claims, No Drawings

CATTLE FEED

BACKGROUND OF THE INVENTION

A general problem with range cattle is the lack of forage available for grazing during winter periods or periods of prolonged drought. During these periods, the health of cattle begins to decline and lice, ticks and other parasites begin to attack.

The inventor noticed that during these times, cattle frequently graze on the leaves of hardwood trees. These trees were harvested, ground and tested by the inventor and were found to contain an abundance of minerals required for a healthy immune system.

BRIEF SUMMARY OF THE INVENTION

This mineral rich hardwood meal was mixed with cottonseed meal in order to improve its palatability and fed to cattle as their sole source of feedstuff for an entire winter.

The nutritive effect of the hardwood meal showed dramatic results on the health of the cattle while on this diet and all lice, ticks and other parasites, such as stomach worms, disappeared.

BRIEF DESCRIPTION OF THE SEVERAL VIEWS OF THE DRAWING

N/A

DETAILED DESCRIPTION OF THE INVENTION

The invention begins with harvesting green hardwood trees—specifically Oak, Pecan and Mesquite that are rich in mineral content. The byproduct of annual tree trimming may be used. The hardwood tree branches are then fed into a commercial wood-chipper. The resulting wood chips are then sun dried and fed into an agricultural tub grinder with a hammermill action sufficient to produce the consistency of common corn meal. This resulting hardwood meal is then mixed at a rate of 2000 pounds of hardwood meal to 300 pounds cottonseed meal using an ordinary fertilizer mixer. Approximately five gallons of liquid molasses is added during the mixing process for the purpose of reducing dust during mixing and adding to the palatability of the feedstuff. The feed can then be bagged or loaded into bulk trucks for dispensing to cattle.

What I claim as my invention is:

1. A method of producing cattle feed consisting essentially of the following steps, in order:
   a. harvesting green hardwood trees selected from the group consisting of oak, pecan, mesquite and varieties thereof
   b. feeding the harvested tree into a commercial wood-chipper
   c. drying the resulting wood chips
   d. grinding the dried wood chips to a corn meal consistency
   e. mixing the hardwood meal with cottonseed meal so that the hardwood meal is in an amount of 80–87% of the feed and
   f. adding molasses to the resulting mixture to produce the cattle feed.

2. A cattle feed product prepared according to the process of claim 1.

* * * * *